United States Patent [19]

Wagstaff et al.

[11] 3,889,887
[45] June 17, 1975

[54] APPARATUS TO CONTROL BOTH THE OPERATION OF A CUTTING REEL AND THE GRINDING MECHANISM OF A FORAGE HARVESTER

[75] Inventors: Robert A. Wagstaff, New Holland, Pa.; Poul K. Pedersen, Kerteminde, Denmark

[73] Assignee: Sperry Rand Corporation, New Holland, Pa.

[22] Filed: Nov. 19, 1973

[21] Appl. No.: 417,461

[30] Foreign Application Priority Data
Oct. 5, 1973  Canada.......................... 182762/73

[52] U.S. Cl. ............... 241/101.2; 51/249; 56/250; 74/15.2; 74/325; 74/665 G; 83/174.1
[51] Int. Cl.² .................. A01D 75/08; B24B 3/42
[58] Field of Search .... 74/15.2, 15.6, 665 F, 665 G, 74/665 GA, 665 GE, 325; 51/36, 48 HE:95 LH, 247, 249; 56/12.1, 250; 76/82.1; 83/174, 174.1; 241/101.2

[56] References Cited
UNITED STATES PATENTS

| | | | |
|---|---|---|---|
| 1,060,283 | 4/1913 | Phillips | 56/250 X |
| 1,807,975 | 6/1931 | Eyres | 83/174.1 |
| 1,985,888 | 1/1935 | Day | 74/15.6 |
| 3,677,316 | 7/1972 | Markham | 83/174 X |
| 3,732,740 | 12/1971 | Fell et al. | 74/15.2 |
| 3,751,859 | 8/1973 | Pedersen et al. | 51/249 |
| 3,793,792 | 2/1974 | Wagstaff et al. | 51/249 |

*Primary Examiner*—Samuel Scott
*Assistant Examiner*—John Reep
*Attorney, Agent, or Firm*—Frank A. Seemar; John R. Flanagan; Joseph A. Brown

[57] ABSTRACT

An apparatus for controlling both the operation of a cutting reel and the grinding mechanism of a forage harvester having a transmission member which supplies power from the drive shaft to a coupling assembly. The coupling assembly is operably associated with the drive means of both the cutting reel and the grinding mechanism to selectively drive the cutting reel in a forward direction while the grinding mechanism is disengaged from the drive shaft, or in a rearward direction while simultaneously driving the grinding mechanism, or to drive the grinding mechanism while the cutting reel is completely disengaged from the drive shaft.

4 Claims, 5 Drawing Figures

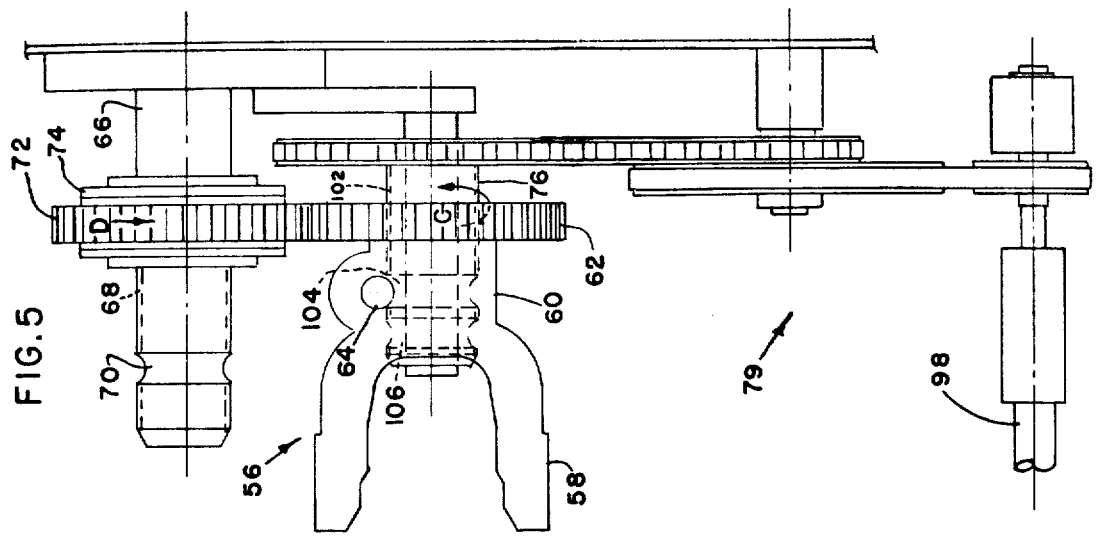
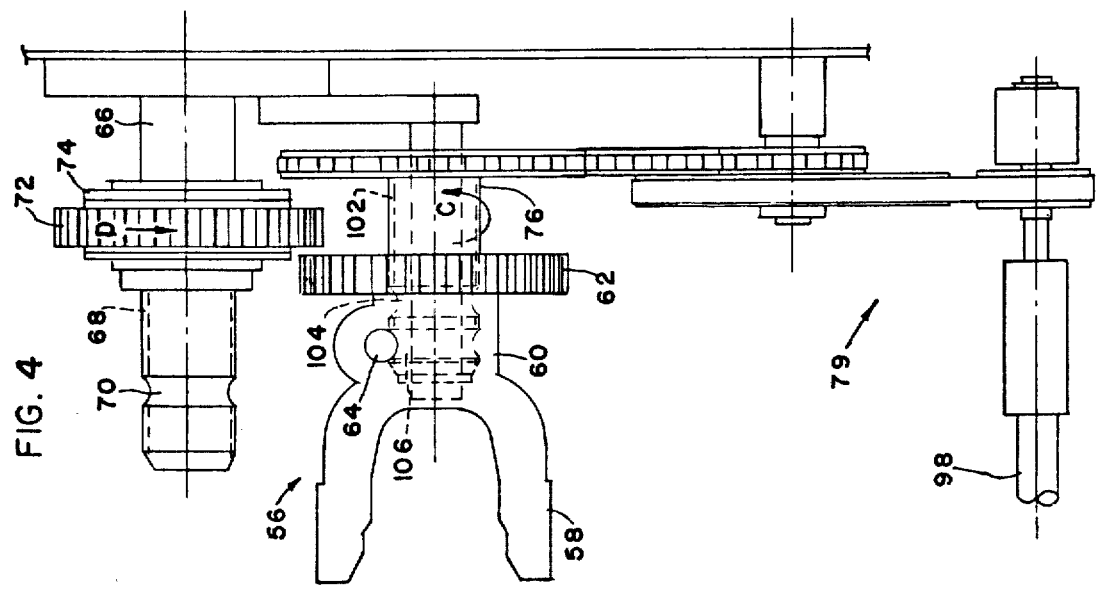

APPARATUS TO CONTROL BOTH THE OPERATION OF A CUTTING REEL AND THE GRINDING MECHANISM OF A FORAGE HARVESTER

BACKGROUND OF THE INVENTION

This invention relates to a forage harvester drive mechanism and is directed particularly to an apparatus for controlling the operations of a cutting reel and the grinding mechanism of a forage harvester.

The blades of a cutting reel of a forage harvester must be continually reground so as to maintain their precise shape and cutting edge in order to perform the forage harvesting operation in the most efficient way possible. Heretofore blades of the cutting reel had to be removed and individually sharpened. This individual sharpening tended to grind to much from one blade and not enough from another thereby creating an uneven and uncylindrical cutting reel.

The most successful and recent development relating to the method of sharpening the blades of a cutting reel is known as the reverse grinding technique. This technique requires the cutting reel of a forage harvester to be driven in reverse during the sharpening operation. The patent issued to P. K. Pederson et al, U.S. Pat. No. 3,678,772, sets out a drive mechanism capable of driving the cutting reel of a forage harvester in a rearward direction. To perform this (regrinding) operation it is necessary to control the operation of the cutting reel so that the drive shaft will operate the cutting reel in either a forward or rearward direction. The drive system as described in this patent is such that when it is desired to sharpen the cutting blades, a coupling on the drive shaft must be disconnected and a roller moved into contact with the rotating drive shaft. This connection creates a friction drive, causing a pulley, in contact with the roller, to rotate in a reverse direction from the normal crop cutting direction, causing another pulley associated with the cutting reel to be driven in a rearward direction thereby driving the cutting reel in a rearward direction. While the cutting reel is rotating rearwardly a grinding stone is manually moved transversely across the blades of the cutting reel. This type of regrinding operation permits the blades of the cutting reel to be reground evenly thereby maintaining a cylindrical configuration and preventing any one of the blades from being ground to a greater degree than any other cutting blade. Finally it has been discovered that to quickly and efficiently sharpen the blades of the cutting reel a second or relief bevel should be ground on the upper portion of the cutting reel blade behind the heel of the cutting edges. This relief bevel is ground by grinding each individual cutting blade of the cutting reel, while the cutting reel is disconnected from the drive shaft.

The patent to Pedersen et al does not describe a method or apparatus for the grinding of a relief bevel on the cutting blades. The Pedersen et al patent also does not contain an apparatus to rotate an abrasive stone associated with the grinding mechanism during the sharpening or relief bevel grinding operation.

The drive mechanism as described above, which is set forth in the Pedersen et al patent has several distinct disadvantages. First, this type of drive mechanism, i.e. a friction wheel drive with a connector, does not provide the positive drive necessary to perform the various rebeveling and regrinding operations. Secondly, the friction wheel drive is continually rotated even when the regrinding (sharpening) operation is not in progress, thereby needlessly dissipating a certain amount of power. Thirdly, the Pedersen et al patent does not describe a means for grinding a relief bevel on the cutting blades of a cutting reel. Further, no means is described to rotate the abrasive stone used with the grinding mechanism.

OBJECTS AND SUMMARY OF THE INVENTION

The principle object of the present invention is to provide an apparatus to control the cutting reel throughout its various operating modes as well as to control the operation of the grinding mechanism when said mechanism is desired to be operated.

Another object of the present invention is to provide an apparatus for controlling the operation of the cutting reel which will directly control the cutting reel without having power dissipated by needlessly running other components of a forage harvester not in operation.

Another object of the present invention is to provide a positive single gear drive to operate both the cutting reel and the grinding mechanism.

Another object of the present invention is to provide an apparatus for selectively controlling the cutting reel of a forage harvester in either its forward or forage harvesting position, or its rearward or regrinding position while the grinding wheel is being driven, or providing an apparatus to control the operation of the grinding wheel while allowing the cutting reel to be completely disengaged from the drive shaft.

In summary, this invention comprises transmission member capable of transferring power from the drive shaft of the forage harvester to its cutting reel and grinding mechanism. The transmission member has a coupling mounted to one of its ends, said coupling being adapted to be mounted to a first rotatable shaft which controls the forward operation of the cutting reel or to various positions along a second rotatable shaft which controls the rearward drive of the cutting reel and the grinding mechanism. One of the positions at which the coupling can be mounted on the second shaft controls both the operation of the cutting reel, so that it is driven in a rearward direction, and the grinding mechanism so that during the rearward rotation of the cutting reel the blades can be sharpened. At another position along the second shaft the grinding mechanism will be driven while the cutting reel is completely disconnected from the drive shaft thereby allowing the cutting reel to be freely rotatable during the rebeveling operation.

Other objects and advantages of the present invention will become apparent and obvious from a study of the following description and the accompanying drawings which are merely illustrative of the present invention.

3

FIG. 4 is an enlarged side view of the present invention in the relief bevel grinding position.

FIG. 5 is an enlarged side view of the present invention in its re-sharpening position.

DETAILED DESCRIPTION OF THE INVENTION

Figure 1:
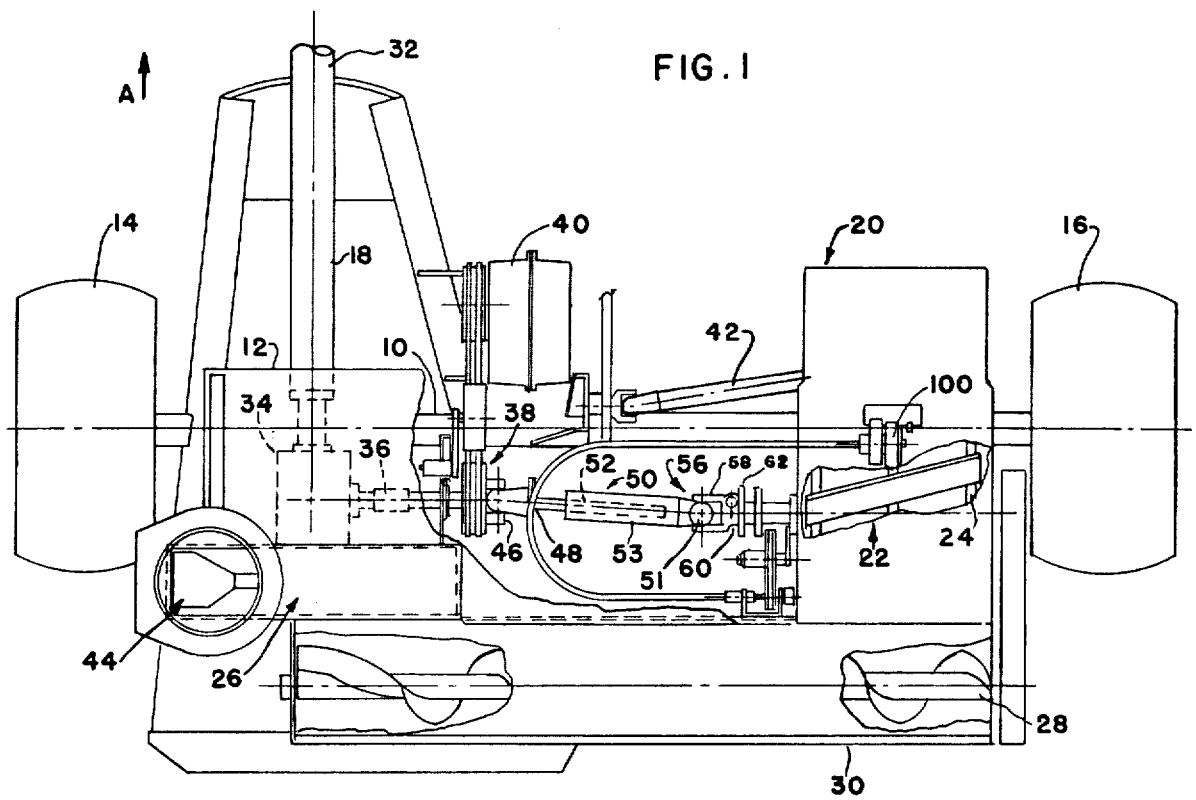
FIG. 1 illustrates a top plan view of a forage harvester.
Figure 2:
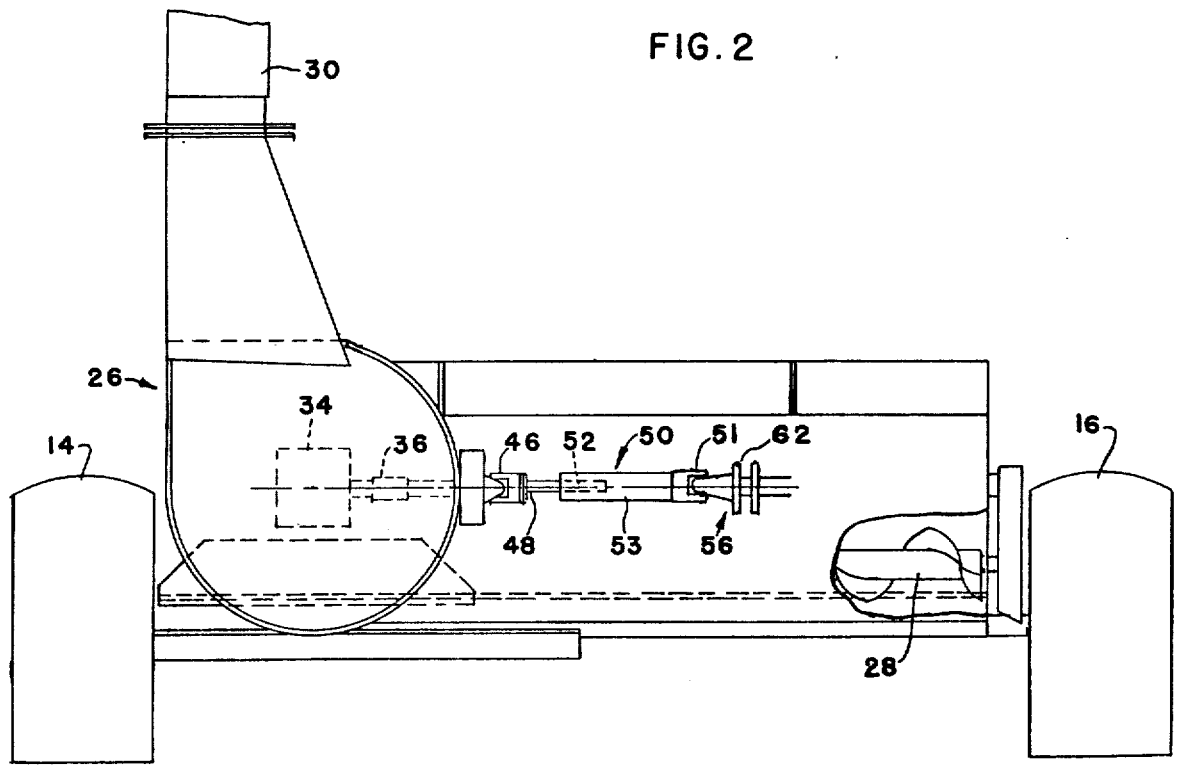
FIG. 2 illustrates a rear view of the forage harvester with a portion of the auger feed mechanism and the blower removed to illustrate the gearbox and drive train.

The forage harvester of the present invention has a transverse main frame 10 which a transversely extending square support beam 12 supported on ground engaging wheels 14, 16, at the respective ends of the beam. The harvester is drawn in direction A by a tubular hitch 18 pivotally connected to the left end (or inboard) portion of beam 12. On the outboard end is a feed roll mechanism 20 which receives harvested crop material from a pickup or row attachment and meters material to a cutterhead 22. The cutterhead has a rotatable cutting reel 24 which has a plurality of blades positioned around its periphery which chop the incoming crop material in cooperation with a shear bar (not shown) in a well known manner. The small pieces of chopped crop material form a silage which is conveyed from the cutting reel 24 to the forage blower 26 by a transverse feed auger 28 positioned along the rear of the harvester. The blower discharges the silage into a trailing wagon (not shown) through a rearwardly extending adjustable spout 30 (FIG. 2).

Power is delivered to the operating mechanism by main drive shaft 32 extending from the tractor power take-off (not shown). The fore-and-aft main drive shaft 32 is connected to the main input gearbox 34 mounted on the inboard end of the forage harvester. The main gearbox contains a 90° drive shaft 36 through which it delivers power to the various components on the outboard side of the forage harvester. The feed roll mechanism is driven from drive shaft 36 through a belt and pulley drive 38, reduction gearbox 40 and connecting drive 42. The fan 44 of the blower 26 is mounted and driven by the main drive shaft 32.

Connected to the end of the drive shaft 36 is universal joint 46. The universal joint secures end 48 of transmission member 50 to the drive shaft. Transmission member 50 comprises rod 52, of which end 48 is connected to the universal joint, and cylinder 53 into which the remaining portion of rod 48 is inserted. Cylinder 53 contains a rubber seal (not shown) placed between the rod and the inner walls of the cylinder. This rubber seal eliminates any harmful torsional forces from being exerted on the cylinder. Connected to the other end of transmission member 50 is coupling assembly 56. The coupling assembly comprises a U-shaped connectors 58 adapted to receive end 51 of the transmission member. Coupling assembly 56 also contains a sleeve portion 60, and sprocket 62 rigidly mounted to the sleeve. Mounted to the sleeve portion of the coupling assembly is securing pin 64 which operates to secure the coupling assembly to various positions on the cutting reel and grinding mechanism drive means.

Connected to both the cutting reel and grinding mechanism of the forage harvester of the present invention are means for driving the respective components of the forage harvester in three distinct modes. Connected to cutting reel 24 is a first rotatable shaft 66 which extends from the cutting reel towards the inboard side of the harvester. First rotatable shaft 66 contains splined end 68 with securing groove 70. Rigidly mounted on the end of the first rotatable shaft is sprocket 72. Connected to the sprocket and the rotatable shaft 66 is slip clutch 74.

The driving means of the present invention is operating in its first mode when the power transmission member 50 is connected solely to rotatable shaft 66. In order to make this connection it is simply necessary to insert sleeve portion 60 of coupling assembly 56 over the splined end portion 68 of the first rotatable shaft and to move securing pin 64 into engagement with groove 70. When that has been accomplished sprocket 62 of the coupling assembly will be positioned adjacent sprocket 72. Such a positioning of the coupling assembly will enable the rotatable shaft to be rotated in direction B during the forward cutting reel motion necessary for the forage harvesting operation.

Positioned parallel to and below the first rotatable shaft is a second rotatable shaft 76. Operably associated with the second rotatable shaft is grinding mechanism drive 79. This grinding mechanism drive consists of a sprocket 80 mounted to second rotatable shaft 76 and on which endless chain 82 is positioned. The other end of chain 82 is positioned around a smaller sprocket 84 mounted on shaft 86 which is rotatably mounted to the forage harvester on bearing 87. Mounted adjacent sprocket 84, upon rotatable shaft 86 is pulley 88. Mounted around pulley 88 and pulley 90 is belt 92. Shaft 94 is rotatably mounted in support 96. Also mounted to shaft 94 is cable 98 which upon rotation of pulley 90 is activated thereby rotating grinding wheel 100.

Rotatable shaft 76 has a splined end 102 over which sleeve 60 can be placed. Further contained on splined end 102 are grooves 104 and 106 into which the securing pin of the coupling can be inserted.

OPERATION

Figure 3:
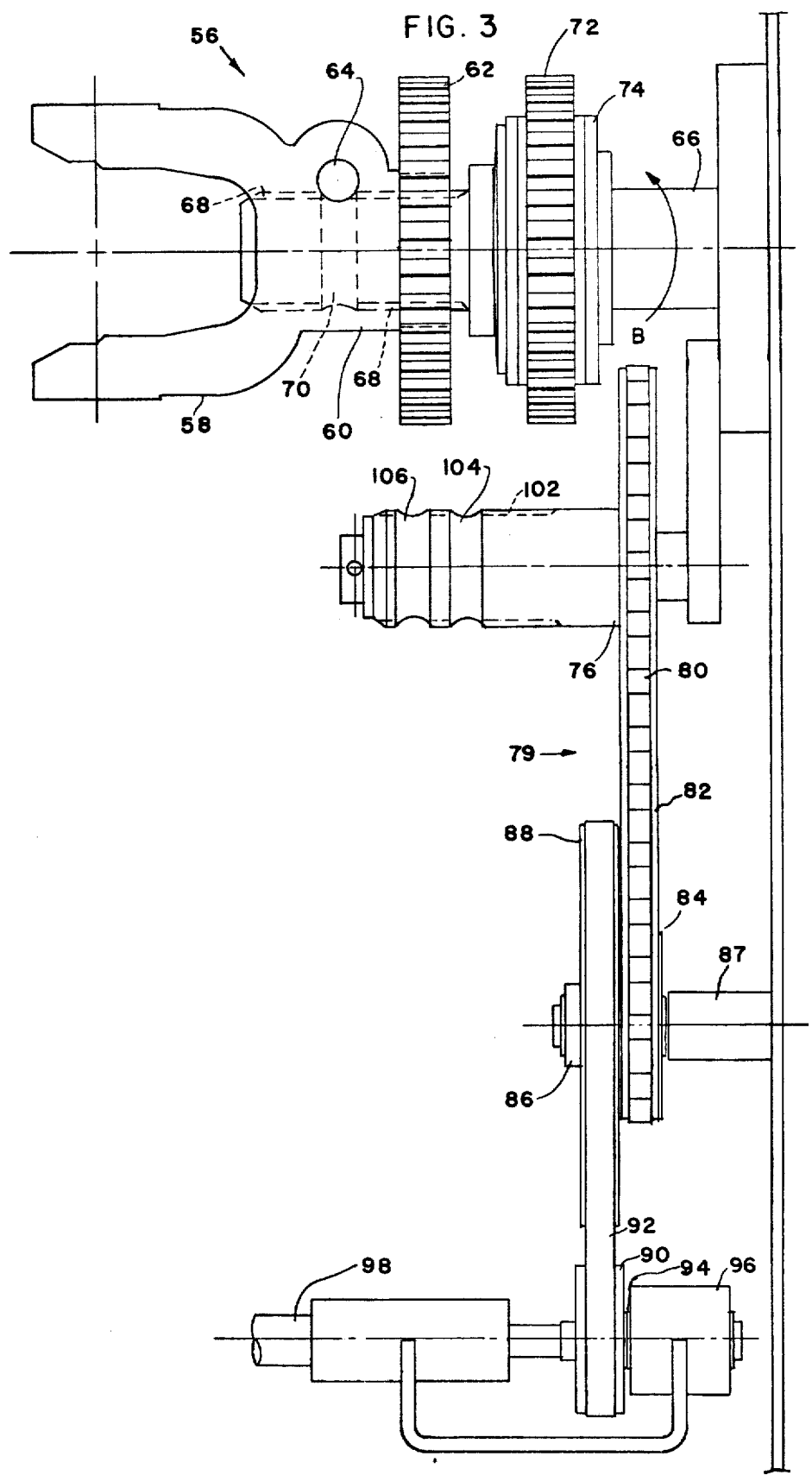
FIG. 3 is an enlarged view of the present invention driving the cutting reel in a forward direction.

During the normal forage harvesting operation (i.e. the first driving mode) cutting reel 24 is rotated in a forward direction, as indicated by arrow B, FIG. 3. To achieve such rotation it is necessary to secure coupling assembly 56 to splined end 68 of the first rotatable shaft 66, as indicated in FIG. 3. The coupling assembly in this position directs power from drive shaft 36 directly to cutting reel 24 thereby driving the cutting reel in a forward direction for cutting the incoming crop material. In this position the second rotatable shaft is not driven and remains completely disconnected from the drive shaft.

When it is desired to sharpen the cutting reel 24 (i.e. the second driving mode) the operator simply retracts securing pin 64 thereby allowing coupling assembly 56 to be removed from first rotatable shaft 66 and placed on second rotatable shaft 76. Once the coupling assembly is positioned on the second rotatable shaft securing pin 64 is inserted into securing position 104 thereby positioning coupling assembly 56 in the position indicated in FIG. 5. In this position the coupling assembly's sprocket 62 is meshed with the first rotatable shaft's sprocket 72 so that upon rotation of the coupling assembly the sprocket 62 will rotate in the direction indicated by arrow C thereby rotating the sprocket 72 in an opposite direction, as indicated by arrow D, causing the cutting wheel to rotate in a rearward or reverse direction during the resharpening operation. Further, when coupling assembly 56 is secured as shown in FIG. 5 the grinding mechanism drive 79, mounted to the second rotatable shaft, is activated and in operation simultaneously with the reverse driving of the cutting reel. The rearward rotation of the cutting reel together with the activation of the grinding mechanism drive allows the operator to perform the sharpening operation in the best manner possible.

Finally, when it is desired to grind a relief bevel on the individual blades of the cutting reel (i.e. the third driving mode) the operator simply removes securing pin 64 and moves coupling assembly 56 so that the securing pin is inserted in groove 106 (FIG. 4). When the coupling assembly is so positioned sprocket 62 is not in contact with sprocket 72 of the first rotatable shaft so that any power transmitted by transmission member 50 will be directed solely to the second rotatable shaft. This type of connection allows the grinding mechanism to be operated without having any driven members in contact with the first rotatable shaft which controls the cutting reel. When the coupling is in this position, the cutting reel can be freely rotated by the operator to grind a proper relief bevel on the cutting blades.

While the preferred structure in which the principles of the present invention have been incorporated is shown and described above, it is to be understood that the invention is not to be limited to such particular details, but that, in fact, widely different means may be employed in the practice of the broader aspects of the invention.

Having thus described the invention, what is claimed is:

1. An apparatus to control the operation of a cutting reel and the grinding mechanism for sharpening the cutting reel of a forage harvester which comprises:
    a. a main power source,
    b. a transmission member having one end fixed to the power source,
    c. a coupling assembly comprising first means for receiving the other end of the transmission member,
    d. driving means including a first rotatable shaft on which said cutting reel is mounted, a second rotatable shaft spaced a distance from said first shaft and means operably associated with said second shaft for driving said grinding mechanism,
    e. said coupling assembly further comprising second means for receiving an end of either said first or second rotatable shafts, and means for securing said second receiving means to said first rotatable shaft or to various positions on said second rotatable shaft to selectively couple said transmission member to the cutting reel and the grinding mechanism in a first driving mode in which the cutting reel is driven in a forward direction while the grinding mechanism is disengaged from said power source, a second driving mode in which said cutting reel is driven in a rearward direction while simultaneously driving said grinding mechanism, and a third driving mode in which said grinding mechanism is driven while said cutting reel is disengaged from said power source.

2. An apparatus as set forth in claim 1 wherein the securing means includes a pin adapted to cooperate with said second receiving means.

3. An apparatus as set forth in claim 2 wherein said first rotatable shaft contains a groove adapted to receive the pin to secure said coupling assembly to said first rotatable shaft.

4. An apparatus as set forth in claim 3 wherein said driving means further comprises:
    a. a first sprocket mounted on said first rotatable shaft,
    b. a second sprocket rigidly mounted to said second receiving means and wherein said second rotatable shaft contains a first position at which said second receiving means can be secured so that the second sprocket will engage the first sprocket whereby rotation of said second sprocket will cause rotation of said first sprocket in a direction opposite to the direction of rotation of said second sprocket, and a second position at which said second receiving means can be secured so that said second sprocket will not engage said first sprocket thereby completely disengaging the cutting reel from said power source and only activating the grinding mechanism connected to said second shaft.

* * * * *